United States Patent Office 2,734,392
Patented Feb. 14, 1956

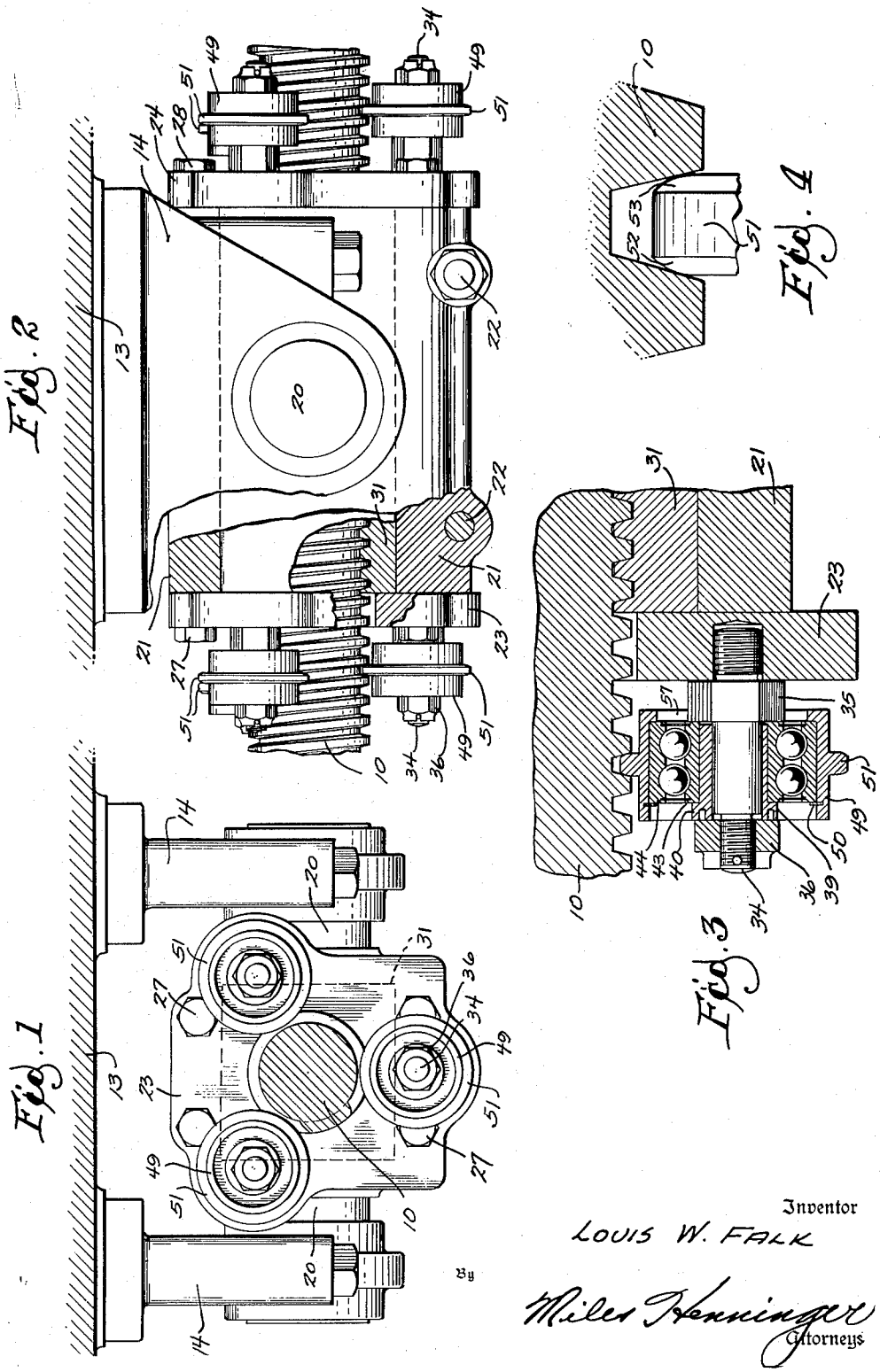

2,734,392

FEED SCREW MECHANISM

Louis W. Falk, Milwaukee, Wis., assignor to The Falk Corporation, Milwaukee, Wis., a corporation of Wisconsin Application August 17, 1951, Serial No. 242,239

11 Claims. (Cl. 74—424.8)

This invention relates to feed mechanisms for machine tools and the like and particularly to feed mechanisms of the screw-and-nut type.

In mechanisms of the screw and nut type, the desired feed movement is obtained by relative axial movement between the nut and screw resulting from relative rotation of either the nut or the screw. One part is held against axial displacement while the other is connected to a tool holder, work carriage or the like to impart movement thereto along the axis of the screw.

It has long been recognized, in feed mechanisms of the screw and nut type, that eccentric loading of the nut is a common cause of premature wear of both the screw and nut threads, with consequent loss of accuracy in the feed rate, and prior efforts to overcome such premature wear have not proven entirely satisfactory. For instance, it is quite common to rockably support the nut intermediate its ends for rendering the nut self-aligning with respect to the screw, but such arrangement does not avoid radial thrusts between the nut and screw such as result from lateral deflection or sagging of the screw or from minute inaccuracies in the screw or nut mountings. It is also quite common to provide a counter-bored portion at one or both ends of a nut to guide the latter on the screw, but a thread-like pattern is soon worn into the counter-bored portions by the action of the screw, thereby impairing their effectiveness as guides.

It is therefore an object of the present invention to minimize wear and prolong the life of a screw-and-nut feed mechanism by the provision of means designed to avoid radial thrusts between the nut and screw.

The object is accomplished by the provision of means adjacent the nut and in rolling contact with the screw to accurately position the screw relative to the nut in all positions of the nut along the screw.

Normal wear in screw-and-nut feed mechanisms commonly results in the formation of wire edges on the thread of the screw which tend to undercut the internal threads of the nut, and also to hasten the wearing action on the counterbored nut ends. By the use of the present invention such edges may be eliminated or so modified as to render the same quite harmless.

Objects and advantages other than those above set forth will be apparent from the following description when read in connection with the accompanying drawing in which:

Fig. 1 is a view in end elevation of a screw-and-nut feed mechanism embodying the present invention.

Fig. 2 is a view in side elevation, with parts broken away, of the device shown in Fig. 1.

Fig. 3 is a fragmentary sectional view on a larger scale, of certain of the parts shown in Figs. 1 and 2.

Fig. 4 is an enlarged fragmentary view illustrating in detail the relation between the screw and supporting roller shown in other views.

Although the present invention may be used to advantage in other types of machine tools, it has particular utility when applied to large horizontal gear hobbing machines wherein the feed mechanism includes a long horizontally extending feed screw, necessarily supported at its ends only, and consequently subject to lateral deflection or sagging due to its own weight and other forces acting thereon between the screw end supports. Therefore, for purposes of illustration and explanation only, the invention will be described as embodied in a horizontal gear hobbing machine. The embodiment shown includes one or more rollers mounted in rotatable but otherwise adjustably fixed relation to and adjacent the nut and in rolling contact with the screw, to sustain the screw against lateral deflection adjacent to and within the nut and to thereby avoid the eccentric loading of the nut and consequent premature wear heretofore experienced in screw and nut feed mechanisms.

Referring to the drawings by reference numerals in which like parts are designated by like numerals, 10 designates a rotatable, longitudinally fixed, feed or lead screw constituting part of a feed mechanism for the tool carriage 13 of a horizontal gear hobbing machine of a well known type, the screw being supported only at its ends. A pair of brackets 14 extend downwardly from the carriage 13 and along the sides of the feed screw 10 to support bearings for trunnions 20 extending from the sides of a box-like frame 21 divided vertically into halves joined by bolts 22. The ends of the frame are severally partially closed by plates 23 and 24 severally fixed to the frame ends by bolts 27 and 28. The frame supports a non-rotating nut 31 traveling on the lead screw 10 as the screw is rotated and thus advances and retracts the machine carriage 13. The nut is preferably made in one piece and of considerable length but may be made in halves for convenience of removal and replacement.

The frame 21 and the nut 31 are aligned with the screw 10 by at least one roller unit at one or both ends of the frame and serving as a movable support for the screw portions adjacent the nut. The roller units, shown as three in number and identical at each frame end, are preferably spaced to engage the screw equidistantly about the screw periphery, but obviously any desired number of rollers may be used which can be placed about the screw. Each roller unit comprises an axle 34 threaded into a frame end plate 23 or 24 and each axle is provided with a flange 35 seated on the end plate. Each of the axles 34 is shown as extending parallel to the screw 10 so that the plane of rotation of the supported roller is substantially normal to the axis of the screw, although under some conditions each of the axles might be slightly inclined to extend normal to the screw threads and so that the plane of rotation of the supported roller is substantially parallel to the screw threads at the point of contact of the roller with the screw.

A portion of the axle supports a bushing 39 of which the wall thickness varies from a maximum to a minimum dimension sufficient only to resist the forces acting on such bushing, and one end of the bushing has a flange 40 to coact with the axle flange in defining a seat for a bearing to be clamped on the axle upon tightening of the nut 36.

The bearing is preferably of the double-row ball type with an inner race 43 seated and clamped on the bushing, while the outer race 44 supports a sleeve-like roller 49 having an internal flange 57 at one end. The roller 49 is positioned on the bearing by a ring 50 snapped into a groove in the internal surface of the roller. An external peripheral rib 51, on the roller, has sides which are preferably rounded as shown at 52 and 53 in Fig. 4, and which are respectively designated "forward" and "rear" edge for convenience of description. The roller rib 51 makes contact with both its forward edge 52 and with its rear edge 53, on and between contiguous opposed faces of the screw thread. The areas of such contacts are preferably minimized by the curved contours of the rib sides 52, 53, as shown.

Although the bearing 43, 44 is disclosed as being held against axial movement and the roller 49—57 is also disclosed as being so held, it is desirable under some conditions to provide for axial movement of the roller. Such axial movement insures against transmission of radial loads to the nut and limits the loading on the nut threads to purely axial forces. Thus, only radial forces are applied to the rollers and only axial forces are applied to the threads, which utilizes each element for the only action to which it is best suited. The axial roller movement is easily provided merely by allowing axial space for seating of the bearing on bushing 39 or axial space for seating of the roller on the bearing.

Wear compensation is obtained by releasing the axle nut 36 and applying a spanner wrench to the end of the bushing 39 for rotation of the bushing on the axle. Due to the varying wall thickness of the bushing 39, such bushing acts as a cam to adjust the depth of engagement of the roller rib 51 with and between the threads of screw 10 for equalizing the pressures of all of the rollers on the screw at all contact points. The shape of the roller rib 51 is preferably such as to avoid contact with the outer edges of the thread of the screw 10, to avoid wear thereon, but at the same time the roller rib is close enough to those edges to roll out any wire edges that might result from wear from other causes, or to so modify such wire edges as to render the same harmless.

In those machines in which the screw extends horizontally and the only serious deflection thereof is that due to gravitational sagging, a single roller disposed beneath the screw at one or both ends of the nut may suffice to prevent eccentric loading and consequent wear on the screw and nut threads, while in other machines it is desirable to employ a set of screw engaging rollers such as shown at one or both ends of the nut to sustain the screw against deflection in any direction within the region of the nut, the use of rollers at opposite ends of the nut being desirable in those instances where the nut is rockably supported intermediate its ends.

Although but one embodiment of the present invention has been illustrated and described, it will be apparent that various changes and modifications may be made therein without departing from the invention as defined in the appended claims.

I claim:

1. In a screw feed mechanism for a machine to be advanced and retracted, a feed screw subject to lateral deflection, a nut threadedly engaged with the feed screw and connected with the machine, the nut being movable axially of the screw, and roller means connected with the nut for rotation relative thereto in rolling engagement with the screw thread to avoid radial thrust between the screw and the nut.

2. In a screw feed mechanism for a machine part to be advanced and retracted, a rotatable feed screw subject to lateral deflection, a nut threadedly engaged with the feed screw and non-rotatably and pivotally mounted on the machine part, the nut being movable axially only of the screw, and roller means positioned by the nut for movement with the nut and rotation relative thereto and rolling engagement with the screw thread to avoid transmission of radial thrusts between the screw and the nut.

3. In a screw feed mechanism for a machine part to be advanced and retracted, a feed screw subject to lateral deflection, a frame movably mounted on the machine part, a nut threadedly engaged with the feed screw and fixed in the frame, and roller means carried by the frame for rolling engagement in axial parallel relation with the screw to align the screw and the nut.

4. In a screw feed mechanism for a machine part to be advanced and retracted, a feed screw, a pair of brackets fixed on the machine part and extending about the screw, a frame pivotally mounted between the brackets and extending adjacent the screw, the frame being divided along the axis of the screw, a nut clamped in the frame upon joining of the parts thereof, the nut threadedly engaging the screw, and a plurality of roller units rotatably connected with the frame for severally and rotatably engaging the screw and aligning the nut therewith.

5. In a screw feed mechanism for a member to be advanced and retracted, a feed screw, a plurality of brackets mounted on the member and extending adjacent the screw, a frame movably mounted on the brackets and extending adjacent the screw, a nut held in the frame and threadedly engaging the screw, and a plurality of roller units rotatably mounted on the frame for several engagement thereof with the screw, each roller unit comprising a cam member mounted on the frame and a roller rotatably mounted on the cam member for rolling engagement with the screw, adjustment of the cam member varying the distance between the screw axis and the roller axis.

6. In a screw feed mechanism for a member to be advanced and retracted, a feed screw subject to deflection radially thereof, a plurality of brackets mounted on the member and extending adjacent the screw, a frame pivotally mounted on the brackets and extending adjacent the screw, a nut clamped in the frame and threadedly engaging the screw, and a plurality of roller units rotatably mounted on the frame at the ends thereof for several and rolling engagement between contiguous threads of the screw, each roller unit comprising an axle mounted on the frame for extending substantially parallel with the screw, a cam bushing about the axle and a peripherally ribbed roller rotatably mounted on the bushing for rolling engagement of the roller rib with the screw, adjustment of the cam bushing varying the distance between the screw axis and the roller axis.

7. In a screw feed mechanism for a machine part to be advanced and retracted, the combination of a screw mounted for rotation and held against axial movement, a nut in threaded engagement with and coacting with the screw to move axially thereof for advancing and retracting the machine part, and a roller positioned by the nut for movement with the nut and rotation relative to and in engagement with the screw, the roller having a peripheral flange engageable between adjacent portions of the screw thread for retaining the screw against radial displacement thereof relative to the nut.

8. In a screw feed mechanism for a machine part to be advanced and retracted, a feed screw subject to radial deflection, the screw being mounted for rotation and held against axial movement, a nut mounted on the machine part to be advanced and retracted and in threaded engagement with and coacting with the screw for advancing and retracting the machine part, and a plurality of roller units rotatably mounted adjacent the nut and comprising an axle, a sleeve about a portion of the axle, the sleeve having a wall of varying thickness and being rotatable on the axle, and a roller rotatably mounted on the sleeve, the roller being moved toward and away from the screw upon movement of the sleeve for holding the screw against radial deflection thereof.

9. In a screw feed mechanism for a machine part to be advanced and retracted, a feed screw subject to radial deflection, the screw being mounted for rotation and held against axial movement, a frame movably mounted on the machine part, a nut non-rotatably and pivotally mounted on the frame and in threaded engagement with and coacting with the screw for advancing and retracting the machine part, and a plurality of roller units mounted on the frame for severally engaging with the screw and holding the screw from deflection radially from a given position thereof, the roller units severally comprising an axle extending from an end of the frame, a cam sleeve mounted on and rotatable about the axle, a bearing mounted on the sleeve, a roller rotatably supported on the bearing and adjustable radially toward and away from the screw upon rotation of the cam sleeve, and a nut threaded on the axle for holding the sleeve and the bearing in predetermined positions.

10. A screw feed mechanism for a machine part, the mechanism comprising the combination of a nut and a screw threadedly engaged and relatively rotatable for relative axial movement therebetween and for sustaining axial thrusts thereon, and lateral thrust-sustaining means including a roller connected to the nut and engaged in rolling contact with the screw and separate from the engagement of the nut and the screw.

11. A screw feed mechanism for a machine part, the mechanism comprising the combination of a nut and a screw threadedly engaged and relatively rotatable for relative axial movement therebetween and for sustaining axial thrusts thereon, and means for sustaining thrusts laterally of the screw and including a roller engaged in rolling contact with the screw and separate from the nut, and a common support for the nut and the roller for maintaining a predetermined positional relationship of the nut and the roller with the screw.

References Cited in the file of this patent

UNITED STATES PATENTS

| | | |
|---|---|---|
| 417,087 | Pratt | Dec. 10, 1889 |
| 511,679 | Buckley | Dec. 26, 1893 |
| 522,249 | Buckley | July 3, 1894 |
| 1,549,845 | Munz | Aug. 18, 1925 |
| 2,330,082 | Side et al. | Sept. 21, 1943 |
| 2,441,168 | Richardson | May 11, 1948 |
| 2,488,256 | Anderson | Nov. 5, 1949 |
| 2,525,326 | Wahlmark | Oct. 10, 1950 |
| 2,545,879 | Frentzel | Mar. 20, 1951 |

FOREIGN PATENTS

| | | |
|---|---|---|
| 3,822 | Great Britain | Oct. 3, 1876 |
| 859,734 | France | Dec. 27, 1940 |
| 888,281 | France | Dec. 18, 1943 |